United States Patent [19]

Conner

[11] 3,987,915

[45] Oct. 26, 1976

[54] TIRE STORAGE AND RETRIEVAL SYSTEM AND METHOD

[76] Inventor: John R. Conner, 3003 Bluffwood Terrace, St. Joseph, Mich. 49085

[22] Filed: Mar. 21, 1975

[21] Appl. No.: 560,971

[52] U.S. Cl. .......... 214/152; 214/16.4 A; 212/18; 294/118

[51] Int. Cl.[2] .......... B65G 47/00

[58] Field of Search .......... 214/16.4 R, 16.4 A, 214/16.4 C, 152, 16 B, 16.1 B, 16.1 BA, 16.1 BB; 294/118, 119; 212/18

[56] References Cited

UNITED STATES PATENTS

| | | | |
|---|---|---|---|
| 2,146,533 | 2/1939 | Erickson | 214/16 B X |
| 2,442,698 | 6/1948 | Lang | 294/118 |
| 2,856,081 | 10/1958 | Zaha | 214/16.1 B |
| 3,240,365 | 3/1966 | King | 214/16.4 A |
| 3,407,926 | 10/1968 | Rosser | 214/16.4 A X |
| 3,539,064 | 11/1970 | Kahn | 214/152 |
| 3,581,921 | 6/1971 | Boissevain | 214/152 |
| 3,709,550 | 1/1973 | Mitchell | 294/118 |
| 3,860,130 | 1/1975 | Frangos | 214/16.1 B |

FOREIGN PATENTS OR APPLICATIONS

| | | | |
|---|---|---|---|
| 1,344,282 | 10/1963 | France | 214/16.1 B |
| 78,625 | 7/1962 | France | 214/16.1 B |
| 567,444 | 10/1957 | Italy | 214/16.4 C |
| 1,224,694 | 3/1971 | United Kingdom | 294/118 |

*Primary Examiner*—Robert J. Spar
*Assistant Examiner*—R. B. Johnson
*Attorney, Agent, or Firm*—Eric S. Spector

[57] ABSTRACT

A tire storage and retrieval structure is shown together with a method of operation. Tires are stored in a rack or bin in a series, to roll by gravity down an inclined chute or ramp means and the series of tires is circulated from the exit on the ramp to the infeed end with power lifting means until the particular tire to be removed from the series comes to the lower or exit end of the ramp. A record keeping means is described for keeping an ongoing record of the tires being rotated and their respective positions in the series stored on the ramp. A plurality of such ramp means and coordinating servicing equipment is provided.

2 Claims, 12 Drawing Figures

Fig. 7
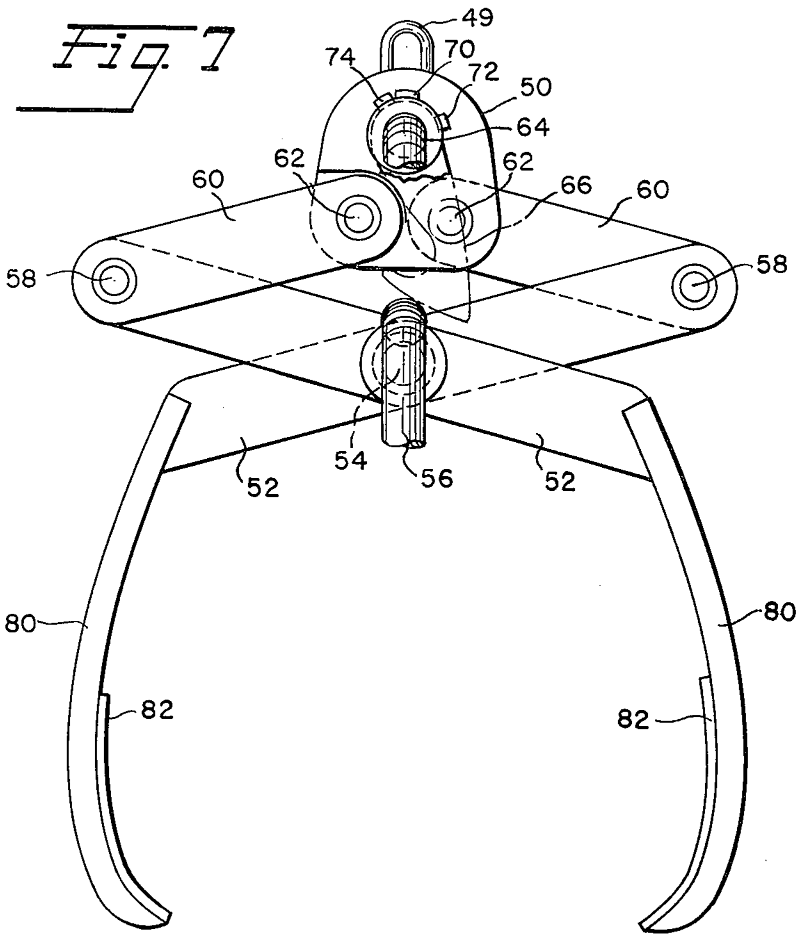
Fig. 9
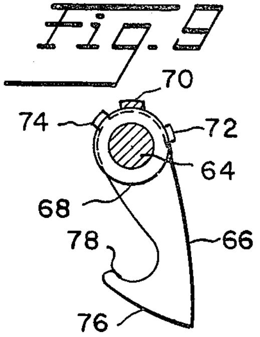
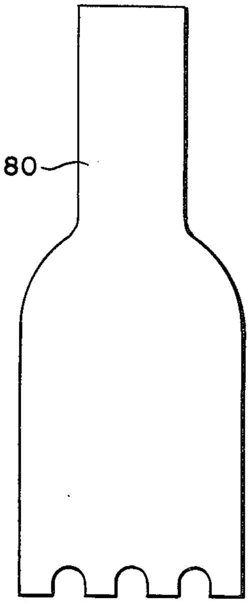
Fig. 10
Fig. 8
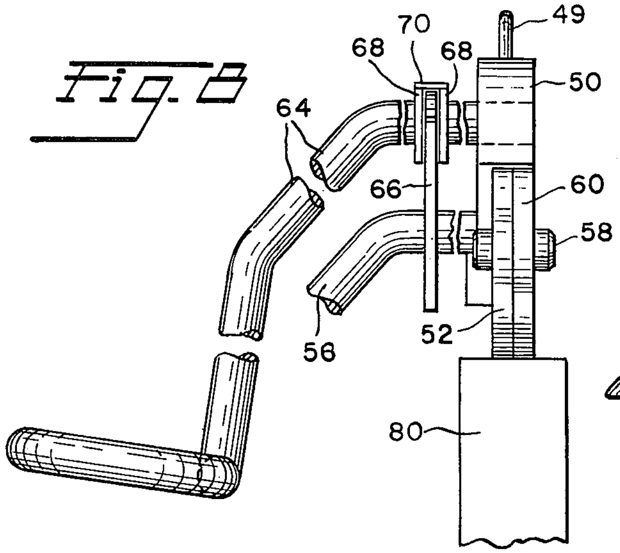
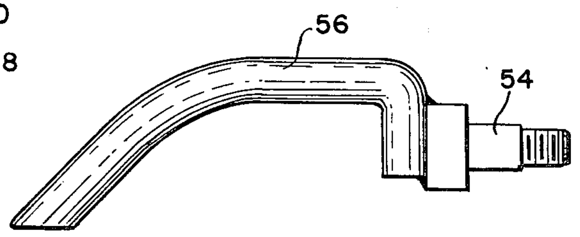
Fig. 11

TIRE STORAGE AND RETRIEVAL SYSTEM AND METHOD

BACKGROUND OF THE INVENTION

The marketing and servicing of tires particularly as practiced at recapping plants of any size, involves the continuous storage and movement of tires from place to place in the plant as various procedures are performed on the tires. Normally tires are stored by leaning them against a wall and long rows of tires are built up requiring much handling and shifting about of tires to remove a particular tire from any given row. Not only is the process of locating the desired tire difficult, but much time and manual effort is spent in retrieving it.

It has been noted that in the past, various articles such as barrels that can be rolled have been stored in inclined racks as shown in U.S. Pat. No. 1,088,980 to Goble, and tires have been stored in warehouses in inclined racks as typified in U.S. Pat. No. 3,753,507 to James et al. Also, various lifting means for unrelated products, operated by power hoisting means have been shown in such patents as U.S. Pat. No. 2,352,017 to Scharpenberg and U.S. Pat. No. 3,675,786 to Wilson.

BRIEF DESCRIPTION

This invention provides an improvement particularly in the storage and handling of tires, especially the heavy, larger sized truck, bus and trailer tires. This invention is particularly provided for use in a tire sales servicing facility and recapping plant where tires of various sizes and specification must be stored in large numbers but are frequently sold and serviced singly or in pairs. It is directed in the preferred embodiment to a system and method for storing tires in a random sequence and quickly retrieving a particular selected tire from that sequence.

In the tire storage and retrieval system and method of this invention, racks or bin means are provided for receiving and storing the tires, the tires being loaded into the bins and retrieved therefrom in a common aisle. There is no waste space between the bins and in addition the tires can be stored in the available space one above the other whereby to maximize the utilization of the space available for storage. The tires are stored in uniform rows in the bins, producing a much neater appearance in the plant compared to conventional practice, but most importantly the tires are stored in the individual bins provided for this purpose in a system making it possible to retrieve a particular tire from those stored in the plant, without substantial physical effort and in a fraction of the time required in the conventional practice of extracting a given tire from the middle of a row of tires leaning against a wall.

In the system of this invention, the bin means has front and rear ends and comprises chute structure having an inlet and an outlet which also constitute respectively an inlet and outlet for the bin. As each tire initially comes into the service area to be stored, it is marked with a number or other identifying indicia and is logged into the system and is placed in a chute thereby becoming part of a series of tires on a ramp and is in position to roll forwardly down that ramp as tires below are removed from the outlet, that is exit, of the bin. Suitable record means is situated at a working station, for example in front of a bin, to be inspected incident to the withdrawal of a tire from the system in order to find the exact location of the particular tire desired in the sequence of tires. When the position of the tire desired is established, the necessary number of tires in front of it are rotated, that is circulated, from the exit of the chute up to the inlet of the chute until the desired tire appears at the exit to be removed for use. The records means is then revised to keep the record system continuously updated. Power means and operating controls therefor are provided to accomplish the necessary rotation whereby an efficient and very rapid selection and removal from storage of any tire in the system can be accomplished without tires which are not currently desired ever being removed from the system.

IN THE DRAWINGS

FIG. 7 is a front elevation of tong means used for picking up tires for delivery to the inlet of a bin;

FIG. 8 is a side elevation partly broken away showing the upper portion of the tongs.

FIG. 9 is a detailed front view of the latch element on the tong mechanism;

FIG. 10 is a detail side elevation of the tire engaging end of the tongs;

FIG. 11 is a detail side elevation of the hinge pin for the tong elements and an integral hand bar for manipulating the tongs and for also engaging the latch on the tong mechanism to hold the tongs in open position after disengagement from the tire; and FIG. 12 is a perspective view of a record keeping device that can be advantageously used with the tire storage structure of this invention.

DETAILED DESCRIPTION

Figure 1:
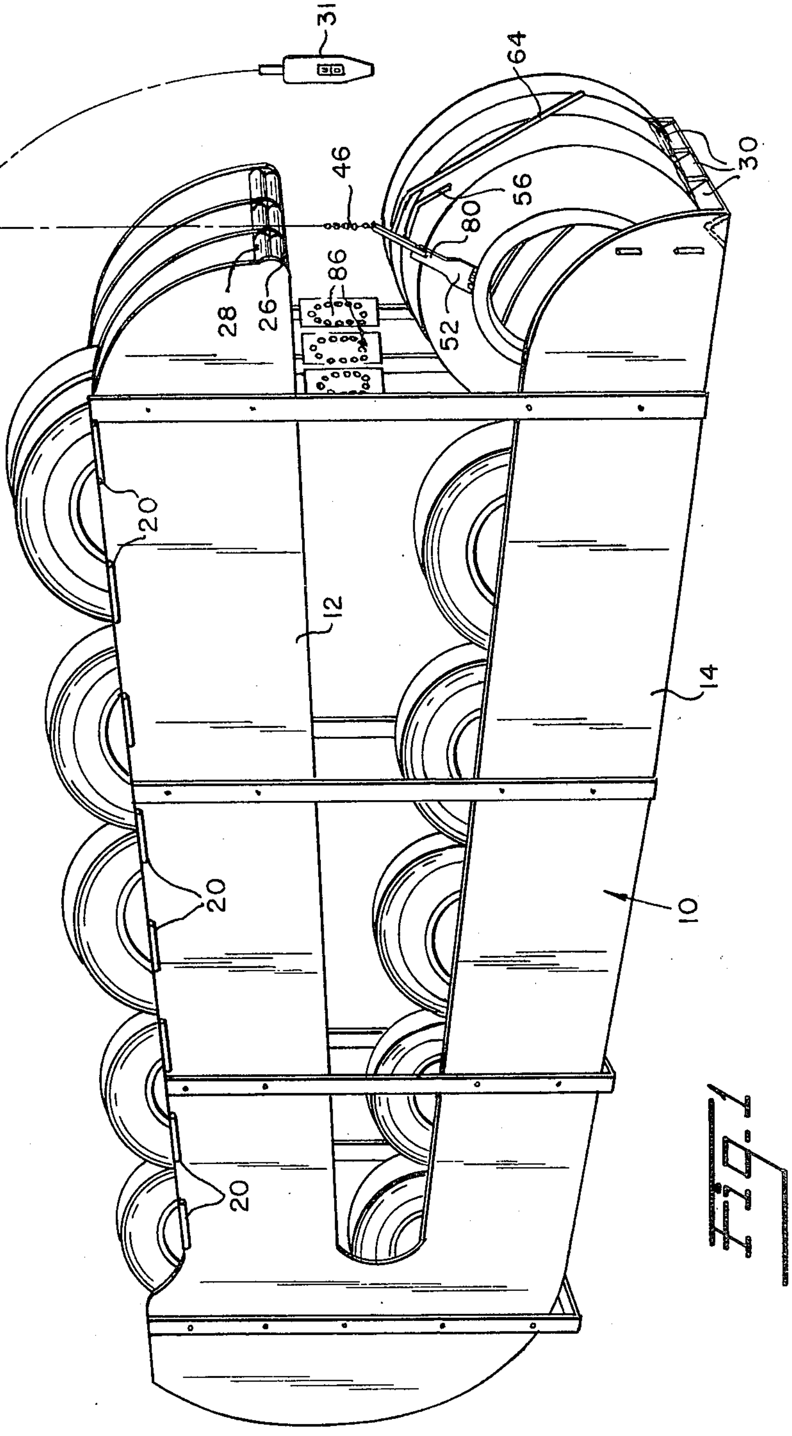
FIG. 1 is a perspective assembly view of the structure of my invention including a showing of an overhead I beam and power hoist means.

Referring to FIG. 1, the storage means for tires takes the form of a plurality of chute like bins 10 each having an upper sloping track 12 and a lower sloping track 14 to support a single line of tires enclosed by walls to hold each tire in upright rolling position and to guide tires placed therein as they roll down the tracks. The front end of each bin faces a working station located under an overhead I beam 16. The I beam 16 is supported above the inlets to the bins and behind the front end of each upper track 12 and serves to carry a power lifting means in the form of a power hoist means 18 preferably driven by an electric motor, not shown. The hosit means has an integral chain bucket 19 to receive the chain as the hoist is operated to lift objects. The plurality of bins is comprised of individual sectional bin elements that are adapted to be assembled side by side, and while each individual bin is a narrow structure, when as many as three or more bins are placed in position and are joined together, a very rigid self sustaining structure results.

Figure 2:
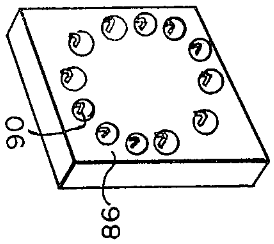
FIG. 2 illustrates how a bin is loaded.
Figure 4:
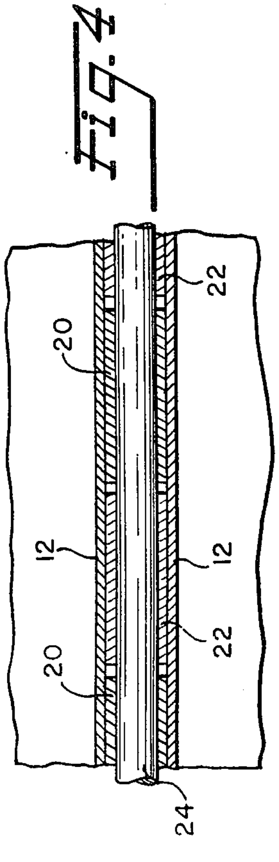
FIG. 4 is a detail sectional plan view of piano hinge means which is preferred structure used for assembling individual chute means showing the wall of one chute joined to the wall of another chute to form storage structure providing a plurality of bins.
Figure 2:
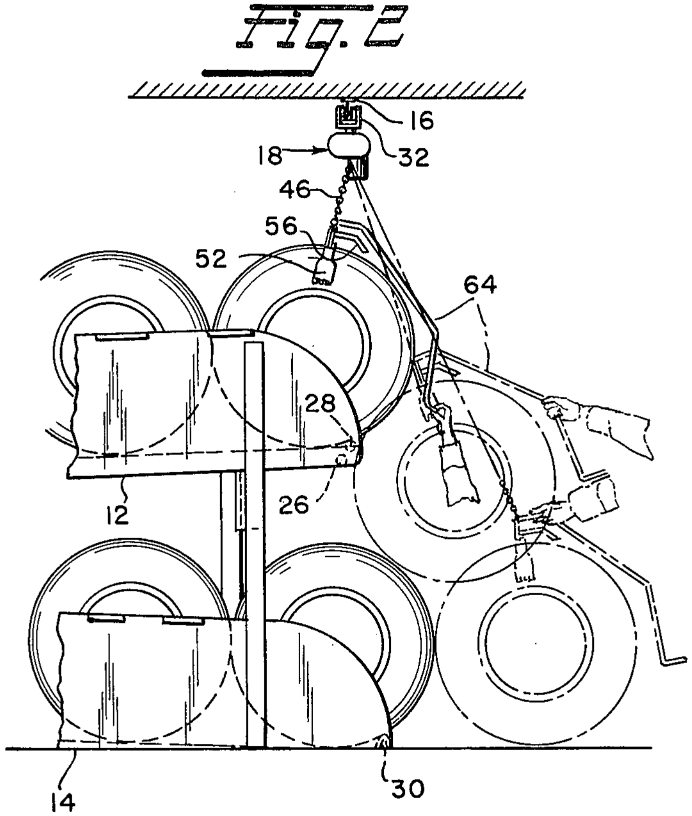

To join the bins, each bin is provided with a plurality of integral spaced apart pipe sections 20 welded thereto on one side that are adapted to interfit with cooperating similar offset pipe sections 22 welded to the respective other side of an adjacent bin and the several pipe sections are spaced to interfit like a piano hinge structure as shown in FIG. 4. A rod 24 is fitted through a set of aligned pipe sections as fastening structure. Cooperating sets of pipe sections 20 and 22 interact to hold the bins fixedly and readily detachably assembled one next to the other when all the rods 24 have been inserted in the several sets of interfitted pipe sections. Preferably, such pipe sections are both on upper and lower levels as shown in FIG. 2.

Turning now to the upper track 12 and lower track 14 of each bin the tracks form part of the chute means that has a width to easily receive the widest tire to be processed, the chutes each being defined by a bottom track and side walls to hold the tires upright. The upper track 12 has inlet rollers 26 and 28 rotatably disposed crosswise across the front end adjacent its working station and under the I beam. The upper track slopes downwardly and away from the working station at its front end so the tires will roll downwardly under the force of gravity toward the back end of the track. At the rear of the bin, the floor of the upper track is relieved so the tires guided by the rear wall portion of the bin can fall downwardly onto the lower track 14. The lower track slopes downwardly from the rear toward the working station and is designed to lead tires toward such station and to an opening at the front end of the bin forming an exit so tires may be removed one at a time from the individual bin being unloaded. A stop element 30 is positioned at the front end of the lower track to hold the full line of tires in place on the sloping floor of track 14 despite the pressure from the other tires behind the first tire in the bin at the exit end. In normal practice, a slope, having about 9 inches drop in 192 inches of length will be found proper to cause large tires or tires on rims such as truck tires to roll easily down the respective chutes where from one to twelve tires can be stored in a line and held stationary by stop 30, without requiring attention from the operator, but any degree of slop can be used that causes the tires to roll easily down the slope without gathering too much momentum. Thus, a variation of several degrees plus or minus can be tolerated from the 4.68% grade indicated above. Slopes of 3.6% grade to 5.8% grade have been found to be desirable for truck tires; with these slopes the track means effect rolling a line of stored tires down such track means under the force of gravity.

The tire storage system here shown, is especially useful where larger tires such as bus, trailer, tractor and truck tires of various sizes are being sold or recapped, although it can be used wherever large volumes of tires must be handled daily. But particularly in the instance of truck tires on wheels that may weigh as much as 180 pounds or so, this storage means will be particularly serviceable when the power hoist 18 is provided which is supported from I beam 16. A power hoist that can lift 250 pounds at a velocity of 12 inches per second will be found to be quite satisfactory for the purpose herein described. The I beam is fixedly supported in a position to hold the power hoist mounted on a suitable carriage, over the front end of the center line of an upper track 12 as best seen in FIGS. 2 and 3.

Figure 5:
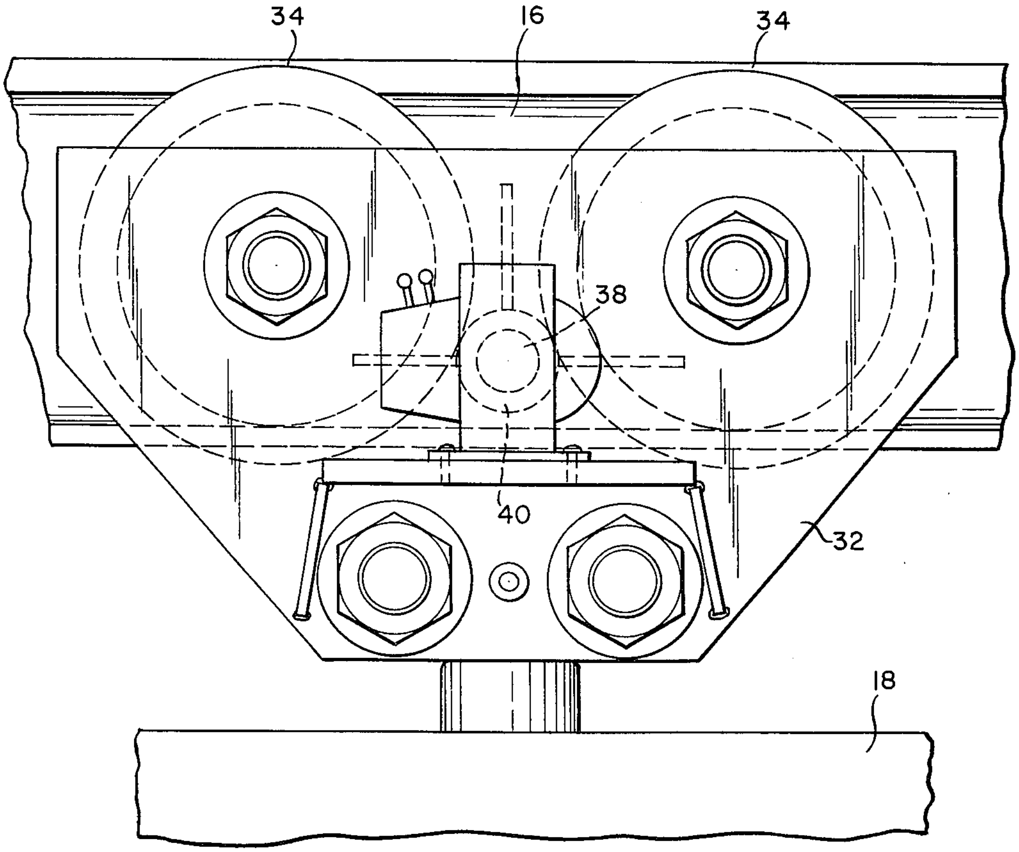
FIG. 5 is a front elevation of trolley or carriage means that rides along the I beam for supporting the hoist.
Figure 6:
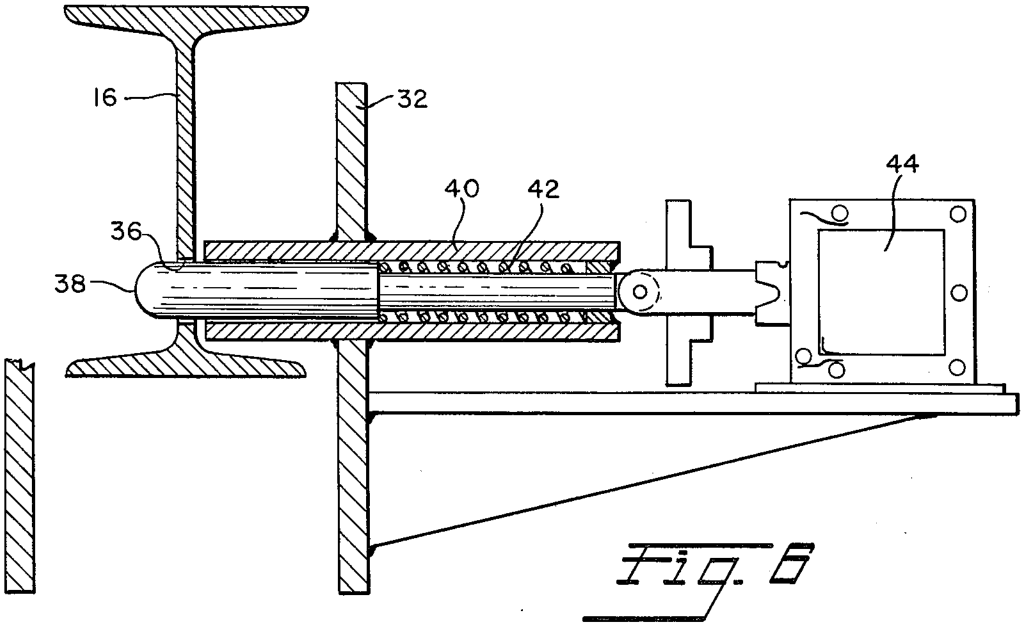
FIG. 6 is a detailed sectional side elevation showing locking pin mechanism for holding the hoist centered in position at a particular chute while tires are loaded or rotated.

The power hoist 18 may be electrically driven and is adapted to be operated from the working station in front of a bin and is responsive to a remote control means 31 in the hand of the operator to lift the load. Hoist 18 is hung from a carriage 32 which as shown in FIG. 5 is supported on four rollers 34 that ride on the bottom flanges of the I beam 16 on the opposite sides of its web. The power hoist 18 supported from carriage 32 disposed above upper track 12 is positioned by means described below so that a vertical centerline drawn downwardly from the carrier will meet the floor of the upper track just to the rear of roller 28. The carriage may be manually pulled along the I beam by means of the hoist chain 46 from place to place to be positioned at the working station in front of the particular bin that is to be serviced. The carriage is adapted to be locked into a fixed position before the bin to be serviced while tires are being lifted by the hoist to its inlet and for this purpose, as shown in FIG. 6, suitable apertures 36 through the web of the I beam are provided at properly spaced locations (one at each working station) along the length of the I beam, the apertures being provided to receive a locking and locating pin 38 slidably carried in a bearing 40 integral with carriage 32. When a bin is to be serviced, the pin is projected into the respective aperture before a particular bin by a compression spring 42 to lock the hoist in position. When the carriage 32 is to be moved to a new location, the pin 38 can be retracted from aperture 36 when a solenoid 44 is energized responsively to the remote control means 31 so that the carriage can be rolled along the I beam to be centered and locked in the new position by pin 38 and another aperture 36.

The power hoist, operating through a chain or flexible cable 46, supports the tong mechanism best seen in FIGS. 7 to 11 at its lower end. The end of the chain or cable 46 is connected to the tong means at a loop 49 of a securing element 50 for raising and lowering the tongs, which operation is under the control of the operator. The mechanism includes cooperating generally L-shaped tong elements 52, the vertical legs of the L pieces being pivotally supported on a common bearing pin 54 that is integral with outwardly extending hand bar or pin 56, see FIG. 11. The upper ends of the L-shaped tong elements are each pivotally connected at locations 58 with the lower ends of articulating links 60 that in turn are each pivotally connected at their upper ends 62 to the lower end of the body of the securing element 50.

Figure 3:
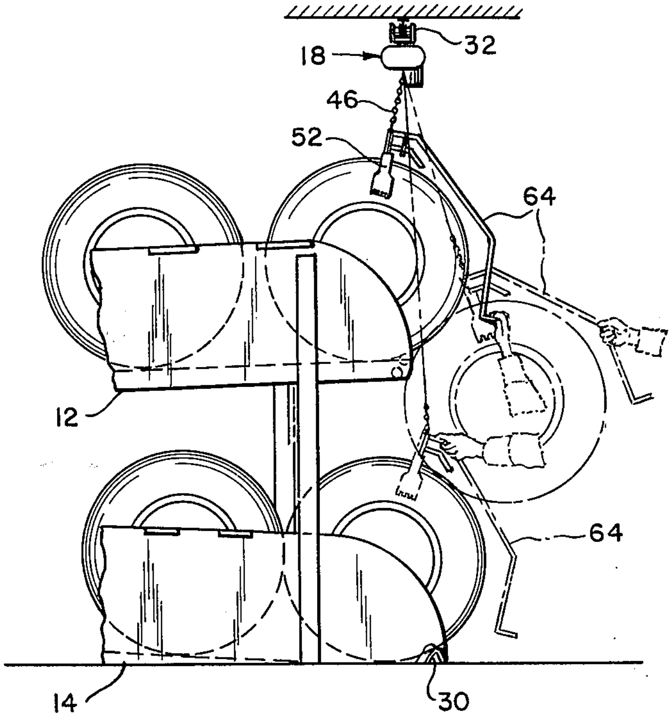
FIG. 3 shows the relative position of the tires in a chute of a bin as a tire is rotated from the exit and a lower track to the inlet and an upper track.

The securing element 50 of the tong mechanism supports an integral, elongated downwardly extending rigid guide handle 64 terminating in an annular hand grip, the handle being bowed to follow generally the curvature of a tire over which it fits as shown in FIGS. 2 and 3. The handle is rigidly attached to the securing means 50 to serve as a guiding means and by manual manipulation even a very short operator can easily control the position of a tire suspended from the hoist.

A hook element in the form of a latch means 66 shown in detail in FIG. 9, and partly in phantom in FIG. 7 is pivotally carried on the upper part of the handle 64 between two spaced apart rings 68 (see FIG. 8) welded to the handle. Across the top of the rings 68 an integral bridge 70 is supported, the bridge forming stop means for cooperating with the latch member 66 that has integral lugs 72 and 74 to engage against bridge 70 to limit the rotary motion of the latch about handle 64. The lower end of the latch member 66 is formed in the configuration of a cam surface 76 (FIG. 9) for engaging against bar 56 when the securing element 50 is lowered onto the top surface of a tire that has been lowered into the inlet of an upper track 12 as shown in solid lines in FIG. 2 to automatically rotate the latch around shaft 64 to allow the latch element to pass over the hand bar 56 whereupon the pull of gravity turns the latch to catch the hook 78 under the hand bar 56 to hold the tong elements 52 in their fully open position so the tong means can be pulled off of the transported tire.

The engaging faces 80 of the tong elements shown in FIG. 10 may take any suitable shape to frictionally engage around the opposite sidewalls of a tire to lift it, the weight of the tire and the articulating links 60 tightening the grip on the sidewalls as the weight of the tire is lifted by the hoist. Preferably, rubber pads 82 are provided on the inside surface of the lower end of each element 80.

In order to load the structure described above, the exit end of the lower track 10 is first loaded for safety purposes with a few tires, for example 3 tires, the lowermost one of which rests against stop 30 as shown in FIG. 2. Several tires may be easily manually rolled into this position through the exit. Then, after the hoist has been moved over the bin to be loaded, locked in position over the front end of the bin with pin 36 in aperture 38, the tong elements 52 are lowered to the operator who manipulates the tongs with hand bar 56 and manually removes latch 66 from engagement under bar 56. The tongs are then closed over the side wals of a tire as the hoist is operated to lift the tire thus drawing the securing element 50 upwardly. As the articulating links 60 are lifted, they cause the pads 80 of the tong elements 52 to close tightly against the sidewalls of the tire. Continued lifting while the operator controls the position of the tire by handle 64, moves the tire successively through the positions shown in FIG. 2 so the tire rolls over roller 28 over the front end of the upper track 12— then by pushing handle 64 toward the bin the tire is moved into the inlet to the upper track to be lowered and eased gently onto the track. At this point, if a previous tire has not moved onwardly, the operator may push the handle 64 to move the suspended tire forcibly against the stationary tire to start it rolling down track 12. After the sapce at the inlet has been cleared, the tire suspended from the hoist may then be lowered to be deposited at the inlet end of track 12. Then the hoist is reversed to lower the tong means and securing element 50 is pulled by gravity so that when the securing means drops toward the tire suspended from the hoist and now deposited in the chute, the articulating links open the tongs to release tongs 52 from the tire and cause the lower end of latch 66 to swing around and engage under hand bar 56. It will be noted, that as the tire is being raised from the floor to the upper track, that the position of the tire's alignment with the chute is easily controlled by the manipulation of handle 64. The rigid handle is fixed to the body of securing means 50 of the tong mechanism and provides sufficient leverage to make it possible to easily direct the tire to move between the walls of the chute as it passes over roller 28. When the tire finally lands on track 12 and the hoist is reversed to lower securing means 50 to open the tongs, the tire is released from the tong mechanism and rolls by gravity down to the end of the track 12 to drop into track 14. It then rolls down track 14 toward the front of bin 10 until it reaches the other tires already loaded into the bin. This process is repeated until twelve, more or less, of normally sized tires are loaded into each bin for storage to provide a line or series of tires.

The handle 64 fixed to the securing body 50 makes it possible to easily control the tongs at all times. The tongs may be tilted away from the vertical while they are being manually manipulated over a tire that is not centered under the hoist by hand bar 56 so the tongs may be attached to the tire for lifting. As the tire is lifted, its position is partly controlled by roller 28 and the downwardly extending handle 64 under the control of the operator is manipulated to insure this contact and further guide the tire into the chute inlet. The hoist and I beam is preferably positioned so that its vertical center line over the inlet places the bottom of the tire one inch behind the center line of roller 28 at the inlet end. The operator can push the tire by means of the leverage of handle 64 to guide the tire properly into the inlet, push any stationary tire onwardly along the slope of the chute, and assist by manipulating the tong means to effect the disengagement of the tongs from the tire.

A record of the serial number or other identifying indicia of each tire is kept as each tire is successively loaded into the respective bins denoting the position of each tire in the sequence in each bin so whenever a particular tire is needed for a customer, the operator can go to the proper bin, locate the hoist in position by locking it with pin 38 engaging in the proper aperture 36 in the web of I beam 16, and then as shown in FIG. 3, the tires in that bin are rotated by lifting the first tire at the exit of the lower track 14 up to the inlet of the upper track 12 and repeating the operation until the desired tire in the sequence comes to the fore, that is to the exit. In other words, a method for storing tires in sequence, even random sequence, and retrieving selected ones of said tires is provided comprising lifting the tires onto an inclined ramp for storage to provide a series of tires, recording on indicators the identity and the position of each tire in the series on the ramp, positioning the indicators in a sequence corresponding to the sequence of the tires stored, holding the tires in rolling relation to the ramp, removing one tire at a time from the lower end of the ramp while the remaining tires roll down the ramp when a tire is to be removed from storage and rotating the removed tire to the inlet at the top of the ramp until the desired tire in the series has moved to the lower end and exit of the ramp, removing the desired tire from the ramp, and removing the indicator of each tire removed from the ramp from the sequence of indicators and making up new indicators as additional tires are stored and inserting such indicators in the sequence of indicators to provide a new sequence of indicators corresponding to the new sequence of tires. The tires which are being circulated incident to obtaining the tire which is desired never leave the system. The specific tire to be retrieved from storage is caused to quickly roll down the track means to the working station at the front end of the bin means.

One record keeping means for the tire storage system shown herein in FIG. 12 makes use simply of an indicator board with a panel 86 having a plurality of hooks 90 disposed in circular arrangement. Indicators in the form of tags are marked with indicia denoting the identity of each particular tire loaded and are hung on on each hook 90 of panel 86 in a clockwise sequence as each tire is loaded into the bin. When a particular tire is to be withdrawn from a loaded bin, it is then only necessary to note the position of the tag of the tire at the exit from track 14, and then count around the board to the tire to be removed; the operator then knows how many tires must be rotated into the upper track 12 to reach the tire wanted at the exit from track 14. It should be noted that the tires remain in sequence until removed or additional tires are added to a particular bin. The tags are coordinated with a suitable ledger book or rack locator book that includes a notation as to the bin into which a tire bearing a particular indicia has been stored, to provide a very simple easily kept record means.

It has been found that the location, selection and removal of a particular customer's tire or any particular tires to be withdrawn from storage for processing can be quickly accomplished even though the tires were placed in the bins in a random sequence and their positions recorded on the panel boards and the rack record book. Once an operator becomes efficient in loading the bins and rotating the tires, selections can be made quite rapidly. An experienced operator can rotate tires on an average of one every 10 or 11 seconds until the desired tire comes to the exit end of track 14. Not only is every tire selection speeded up but a larger number of tires can be stockpiled in a given area in a much more orderly appearing manner.

Not only is there a speeded up delivery of tires as compared with the conventional storage system used heretofore in the typical recapping plant, but a substantial savings in space is realized. Where tires are stored in rows leaning against a wall, in a truck tire recapping plant one must plan for about 4 or more square feet storage space for each tire. If tires are laid flat and piled one on another at least 4 or more square feet must be provided for each tire stored, when space is provided between piles for retrieving tires. With the above described system, when the bins have a width between walls of from 12 inches to 12½ inches, tires can be stored in an average space of from about 2.1 to 2.3 square feet per tire.

The above describes the preferred form of the invention and it is apparent that many modifications thereof may occur to those skilled in the art. For example, the combination of the bins and power lifting means are useful even without record keeping means where the tires are stored in a more or less predetermined order in relation to size and quality or where the number of tires is small enough so that consulting a record to locate a particular tire is not necessary. Thus, the limits of the invention are defined by the scope of the claims.

I claim:

1. Method for handling tires utilizing apparatus comprising storage means including sloping track means having an inlet at its upper end and a passageway at its lower end and a front end adjacent a working station and a rear end removed from the working station and having upper and lower levels communicating with each other at said rear end with the upper level sloping downwardly and away from said front end and the lower level sloping downwardly and toward said front end so that the inlet of the track means and the passageway at its lower end are both adjacent the working station and including stop means at the lower end to hold the tires in rolling relation to the track means, overhead power hoist means with a flexible lift means, gripper means including an elongated handle to be manipulated by an operator at the working station, means attaching said gripper means to said flexible lift means, said method comprising the steps of a. placing tires on the track means to provide a series of tires on the track means in rolling relation to the track means and extending from the passageway at the lower end, b. circulating tires including the steps of gripping the tire positioned at the lower end of the track means with the gripper means, removing that tire from the passageway at the lower end and lifting it to the inlet at the upper end by means of the hoist means, guiding the tire utilizing the handle means, and depositing the tire on the track means, whereby tires on the track means roll toward the passageway at the lower end, c. retrieving a desired tire.

2. Method as recited in claim 1 where the apparatus comprises a plurality of track means positioned side by side, said method comprising the additional step of positioning the hoist means in front of the track means to be serviced.

* * * * *